(12) United States Patent
Mörsch

(10) Patent No.: US 7,483,092 B2
(45) Date of Patent: Jan. 27, 2009

(54) BACK-LIT LIQUID CRYSTAL DISPLAY, IN PARTICULAR FOR USE AS A DISPLAY MODULE BEHIND THE OPERATING PANEL OF A LARGE DOMESTIC APPLIANCE

(75) Inventor: Norbert Mörsch, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 447 days.

(21) Appl. No.: 10/999,441

(22) Filed: Nov. 29, 2004

(65) Prior Publication Data

US 2005/0083449 A1   Apr. 21, 2005

Related U.S. Application Data

(63) Continuation of application No. PCT/EP03/07206, filed on Jul. 5, 2003.

(30) Foreign Application Priority Data

Jul. 11, 2002   (DE) .............................. 202 10 707 U
Sep. 13, 2002  (DE) ................................ 102 42 589

(51) Int. Cl.
*G02F 1/1333* (2006.01)
*G02F 1/1335* (2006.01)

(52) U.S. Cl. .............................. 349/58; 349/64; 349/67

(58) Field of Classification Search .............. 349/58–67
See application file for complete search history.

(56) References Cited

U.S. PATENT DOCUMENTS 4,772,100 A * 9/1988 Suenaga ..................... 349/58

4,796,977 A   1/1989 Drake (Continued)

FOREIGN PATENT DOCUMENTS

DE    35 26 511 C2   2/1986

(Continued)

OTHER PUBLICATIONS

Yee, E.: "Molded Interconnect Devices Reshape Electromechanical Design", Electronic Design, Sep. 5, 2000, pp. 141, 142, 144, 146, 148.

(Continued)

*Primary Examiner*—Dung T. Nguyen
(74) *Attorney, Agent, or Firm*—Laurence A. Greenberg; Werner H. Stemer; Ralph E. Locher

(57) ABSTRACT

A display module has a back-lit liquid crystal cell and is used in particular in an operating panel of a large domestic appliance. A particularly inexpensive structure is afforded in which the height-wise dimension of the module is affected by bracing a frame that mounts the liquid crystal cell and a light-guide panel under it against a circuit carrier whose surface on which the light-guide panel rests is in the form of a reflector surface. The circuit carrier has integrated conductor tracks and a receiving device formed therein for the light-guide panel. The frame can be fitted over the sandwich structure of the light-guide panel and the liquid crystal cell. Fixing as between the frame and the circuit carrier is effected by resiliently latching barb hook members, and with through-engagement of positioning studs or pillars. The free ends of which are subjected to hot peening for fixing the position thereof.

10 Claims, 1 Drawing Sheet

U.S. PATENT DOCUMENTS 4,914,553 A    4/1990    Hamada et al.
6,523,966 B1 *  2/2003    Satoh et al. .................. 362/601
7,215,390 B2 *  5/2007    Morsch ....................... 349/67

FOREIGN PATENT DOCUMENTS

JP    05-040253    *    2/1993
JP    06011718         1/1994
JP    10153764         6/1998

OTHER PUBLICATIONS

Patrick Trueson: "LED steht Kopf" [LED stands on its head], *Design & Elektronik*, No. 6, 2002, pp. 25-27, XP009018050.

* cited by examiner

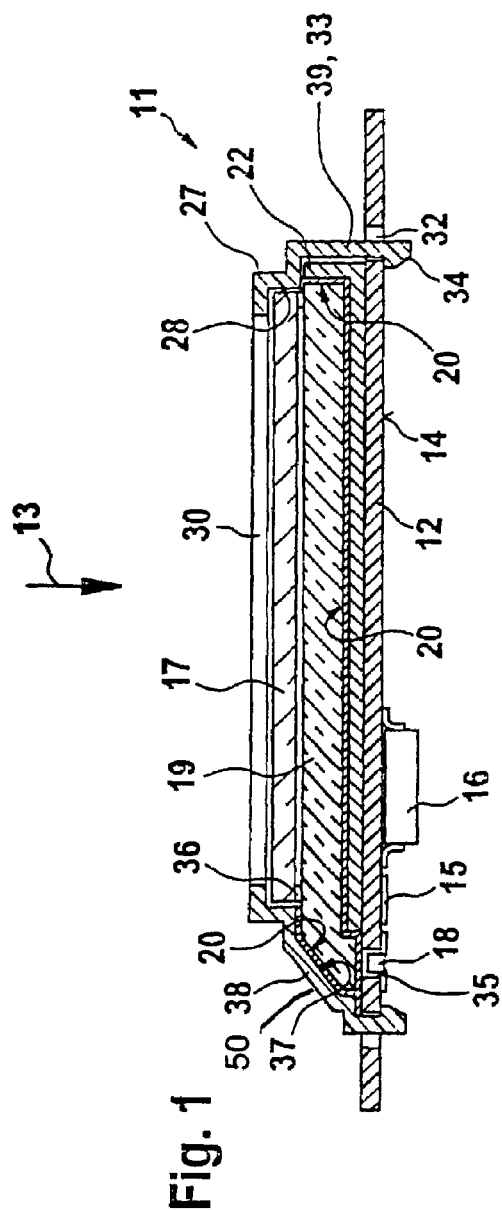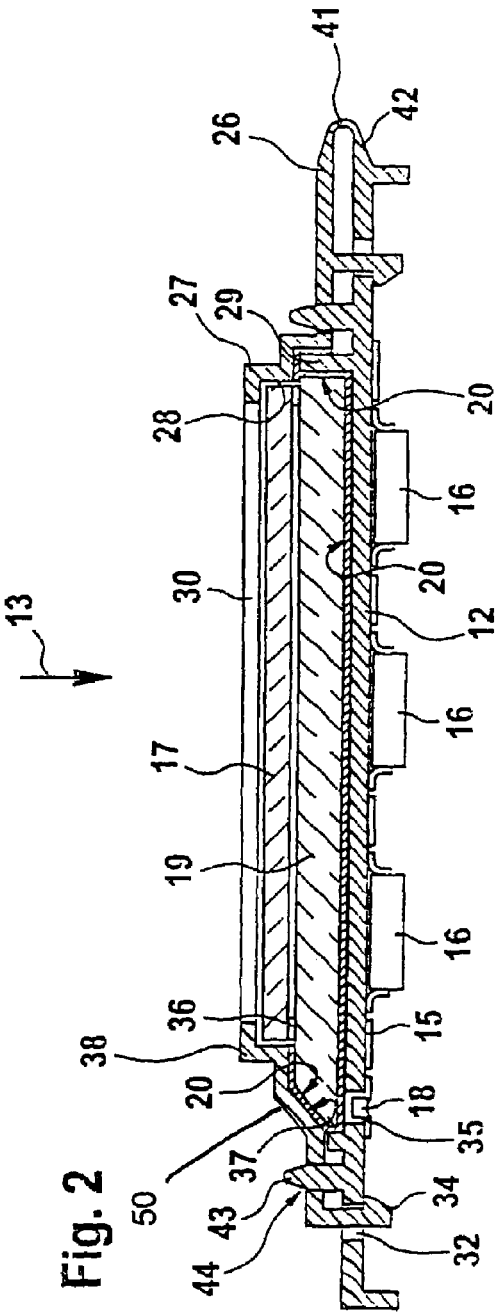

BACK-LIT LIQUID CRYSTAL DISPLAY, IN PARTICULAR FOR USE AS A DISPLAY MODULE BEHIND THE OPERATING PANEL OF A LARGE DOMESTIC APPLIANCE

CROSS-REFERENCE TO RELATED APPLICATION

This is a continuing application, under 35 U.S.C. § 120, of copending international application No. PCT/EP2003/007206, filed Jul. 5, 2003, which designated the United States; this application also claims the priority, under 35 U.S.C. § 119, of German patent applications No. 202 10 707.8, filed Jul. 11, 2002, and No. 102 42 589.2, filed Sep. 13, 2002; the prior applications are herewith incorporated by reference in their entirety.

BACKGROUND OF THE INVENTION

Field of the Invention

The invention concerns a liquid crystal display as is known for example from Japanese Patent Application JP 10-153764 A. There, the liquid crystal cell is integrated into a H-shaped structure, the crossbar of which makes up the optically active cell and the limbs of which act as spacers between a glass plate which is disposed thereover at the viewing side and a circuit carrier which is disposed therebeneath. Disposed beneath the optically active liquid crystal cell is a light guide that is surrounded by a reflecting housing and into which the light of a light emitting diode is laterally irradiated.

Rubber contacts for the electrical connection of the liquid crystal cell to the circuit carrier are disposed outside the limbs, between the overhanging glass plate and the circuit carrier. The mechanical structure is completed by a box-shaped frame which is fitted over the sandwich structure formed of the circuit carrier, the light guide, the liquid crystal cell and the glass plate and which, at the end edges of its side walls, is provided with L-shaped hooks which engage behind the edge of the circuit carrier. In that configuration, the module height of that liquid crystal display is determined by the thickness of the viewing window in the frame, the circuit carrier, the H-shaped structure and the glass plate which is pressed on to the H-shaped structure by the frame. It will be noted however that this is critical in regard to production engineering because local load peaks can result in damage to the glass plate and thus can result in the optical effect of that liquid crystal display being adversely impaired.

German Patent DE 35 26 511 C2, corresponding to U.S. Pat. No. 4,914,553, also discloses a liquid crystal cell backed by a light-guide panel. Light is irradiated from one of the narrow sides of the panel into the light-guide panel there substantially parallel to the main plane thereof. The light-guide panel which is wedge-shaped in the light irradiation direction and thus in longitudinal section is of a stepped configuration at its rear side which is remote from the liquid crystal cell, so that light is coupled out, at the step edges, through the thickness of the panel, into the liquid crystal display, in opposite relationship to the viewing or observation direction thereof. As a consequence of the discrete step geometry at the rear side of the light-guide plate however, in spite of the wedge shape thereof, it is not possible to reckon on light shining through the transmissive liquid crystal cell in a sufficiently homogeneous condition, and the sudden changes in brightness which occur between the steps in the light-guide panel in addition also make it difficult to read off an alpha-numeric representation of information. That prior publication also does not specify how a compact modular structure that is also production-friendly in regard to inevitable component tolerances could be specifically configured for the display with the inclusion of the actuating circuit for its liquid crystal cell.

A liquid crystal display is also known from Japanese Patent JP 06-011718, in which a frame engages over a liquid crystal cell and the frame is secured to a flat light source.

U.S. Pat. No. 4,796,977 describes a liquid crystal display having a holding frame that is fixed to a holding plate by barb hooks which engage through openings in the holding plate.

The article 'LED steht Kopf' by Patrick Trueson from Design & Elektronik June 2002, pages 25 through 27, describes what is known as Reverse-Mount-LED Technology, in accordance with which a light emitting diode mounted on the rear side of a circuit board irradiates light through an opening in the circuit board into a light guide disposed on the front side of the circuit board and a liquid crystal cell disposed on the light guide. However, the light irradiation effect which takes place directly in opposite relationship to the viewing direction of the display causes very non-uniform illumination of the display area of the liquid crystal display as a great amount of light is radiated into the liquid crystal cell in the region of the opening in the circuit board, but the back-lighting becomes progressively darker, the further the display area to be illuminated is remote from that opening.

SUMMARY OF THE INVENTION

It is accordingly an object of the invention to provide a back-lit liquid crystal display, in particular for use as a display module behind the operating panel of a large domestic appliance which overcomes the above-mentioned disadvantages of the prior art devices of this general type, which does not necessitate expensive assembly requirements and the liquid crystal display is suitable in particular for use in the operating panel of a large domestic appliance, by virtue of a compact and tolerance-resistant flat module structure.

With the foregoing and other objects in view there is provided, in accordance with the invention, a back-lit liquid crystal display. The crystal display contains a circuit carrier, a liquid crystal cell electrically and mechanically connected to the circuit carrier, and a light-guide panel disposed under the liquid crystal cell and through which light passes therethrough transversely with respect to a viewing direction. The light-guide panel has a limb and a first reflector surface. A frame accommodates the liquid crystal cell and the light-guide panel. The frame is connected in a force-locking and/or a form-locking relationship to the circuit carrier. The frame, the circuit carrier, the liquid crystal cell, and the light-guide panel define a display module for use behind an operating panel of a large domestic appliance. The circuit carrier has a first surface oriented towards the light-guide panel and thus opposite to a second surface for fitment with component elements. The first surface functions as a second reflector surface. Light sources radiate light through the circuit carrier into the limb of the light-guide panel and towards the first reflector surface for light deflection and thereby for lateral light entry into the light-guide panel.

In accordance with the invention, the object is attained in that there is implemented a sandwich structure containing the prefabricated individual parts in the smallest possible number, which, as stated there, can be latched to each other or which rest one within the other. The configuration affords a particularly inexpensive construction for the display module with its back-lit liquid crystal cell, as is involved in particular in the operating panel of a large domestic appliance, if the height wise dimension of the module is effected by bracing a frame which mounts the liquid crystal cell and a light-guide panel under it against a circuit carrier whose surface on which the light-guide panel rests is in the form of a first reflector surface. In addition light sources radiate light through the circuit carrier into a limb at the light-guide panel towards a second reflector surface for light deflection and thereby for lateral light entry into the light-guide panel.

Preferably the circuit carrier with integrated conductor tracks and receiving device formed therein for the light-guide panel is produced using MID-technology as an injection molding to which the frame is also integrally pivotably connected by way of a film hinge, which frame can be fitted over the sandwich structure of the light-guide panel and the liquid crystal cell. Fixing as between the frame and the circuit carrier is effected for example by resiliently latching barb hook members, with through-engagement of positioning studs or pillars, the free ends of which are subjected to hot peening for fixing the position thereof.

Other features which are considered as characteristic for the invention are set forth in the appended claims.

Although the invention is illustrated and described herein as embodied in a back-lit liquid crystal display, in particular for use as a display module behind the operating panel of a large domestic appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, vertical longitudinal section view of elements, assembled to form a display module, having a sandwich structure according to the invention; and FIG. 2 is a sectional view of a structural configuration which is modified in relation to FIG. 1 and which is distinguished by an even smaller number of individual parts.

DESCRIPTION OF THE PROFFERED EMBODIMENTS

Referring now to the figures of the drawing in detail and first, particularly, to FIG. 1 thereof, there is shown a structural basis for the sandwich structure of a display module 11. The display module 11 has a back-lit liquid crystal cell 17, and a circuit carrier 12 which, at least on its rear side 14 which is remote from a viewing direction 13, is provided with conductor tracks 15 for the fixing and wiring of components 16, in particular for actuation of the liquid crystal cell 17 and light sources 18.

The light sources 18 irradiate in the opposite direction to the viewing direction 13 through the circuit carrier 12 into an angled limb 50 on a light-guide panel 19 and are deflected therein at a reflector surface 37 in order thereby to pass laterally into the light-guide panel 19 which there is substantially plane-parallel. The light passes therefrom through the liquid crystal cell 17 which is disposed in front thereof at the viewing side, transversely with respect to the main plane of the light-guide panel 19, once again in the opposite direction to the viewing direction 13, in order to cause the instantaneous symbol representation in the display module 11 to be represented in a high-contrast fashion. For intensive but diffuse irradiation of light into the cell 17 the coupling-out surface of the panel 19, which is adjacent to the cell 17, is roughened, this preferably already being effected by suitable profiling of the injection-molding mold or otherwise only subsequently for example by sand blasting or by coating with rough lacquer or with a rough foil or film. The other surfaces of the light-guide panel 19 are as smooth as possible and preferably polished because this gives the best properties in regard to the desired total reflection for light conduction over the entire surface of the panel 19.

To provide the desired transillumination of the liquid crystal cell, which is as uniformly bright as possible, over the entire display surface area thereof, and thus in order to increase the light yield, the light-guide panel 19 is backed by a reflector surface 20, in opposite relationship to the roughened radiation-emission surface. The reflector surface 20 can be the bottom of a trough-shaped receiving device 22 for accommodating the light-guide panel 19, the receiving device 22 being provided or arranged on the circuit carrier 12, wherein the bottom is reflecting in regard to the choice of material (high proportion of white pigment) or in regard to a coating (a coat of paint or for example a tin foil covering). Alternatively, the reflector surface 20 may also simply be a covering which is a good reflector and which is painted thereon or laid thereon, for example on a conventional lined circuit board serving as the circuit carrier 12, or a circuit board containing a material which has a bright surface which is a good reflector.

The elements of the display module 11 that is constructed in a sandwich-like structure on the circuit carrier 12 are fixed in position by a peripherally extending frame 27 having a viewing opening 30. Provided in a recessed configuration below the viewing opening 30 is a receiving device 28, extending around the periphery thereof in a step, for receiving the periphery of the liquid crystal cell 17, at the viewing side. The frame 27 is fitted over the light-guide panel which is already laid on the circuit carrier 12 and its reflector surface 20 and which has the liquid crystal cell 17 resting thereon, and is fixed to the circuit carrier 12, while observing a predetermined overall structural height for the module.

Desirably, inserted between the liquid crystal cell 17 and the light-guide panel 19 is a spacer 36 which extends for example in a peripheral ring-like configuration and which can be compressed with a high level of stiffness. The spacer 36 provides that, in spite of inevitable production tolerances, over the entire surface area within that peripherally extending spacer 36, a thin air gap remains guaranteed between the light-guide panel 19 and the liquid crystal cell 17 when it is braced by the frame 27 in the viewing direction 13 to the circuit carrier 12 so that no surface distortion phenomena can result from only local contact, with its specific pressure which is therefore high, and also troublesome contact phenomena such as Newton's rings are avoided.

When the frame 27 is fitted in position, which takes place in the viewing direction 13, a spring element 40 which is inserted or which is provided on its side wall 39 presses transversely with respect to the viewing direction 13 and thus parallel to the circuit carrier 12 directly or (by way of an elastic side wall of the receiving device 22) indirectly against the adjacent edge of the light-guide panel in order to cause a deflection surface 37 which is in opposite relationship therewith, for the light coupling-in effect, to bear snugly against the correspondingly inclined reflector wall 38. That promotes low-loss deflection of the light irradiation from the light sources 18 through openings 35 in the circuit carrier 12.

When the light-guide panel 19 is resting in the trough-shaped receiving device 22 (irrespective of whether it is provided integrally with the circuit carrier 12 or is inserted separately as an accessory component), then the inclined reflector wall 38 is desirably that part of an edge portion of the trough configuration, besides which an edge region of the light-guide panel 19 extends through the bottom of the trough portion which moreover is of a reflecting configuration, in an angled direction, towards the opening 35 with the light source 18. The inclined reflector wall 38 for the light irradiation deflection surface 37 of the light-guide panel 19 can however also be a constituent part of the cap-shaped frame 27, as in FIG. 1.

For bracing the frame 27 in relation to the circuit carrier 12 to afford a predetermined module height it is possible (see FIG. 2, this is not taken into consideration in FIG. 1) for the frame 27 to be provided with a flange-shaped collar 26 which extends around it at a certain internal spacing above the circuit carrier 12 and which is screwed to the circuit carrier 12 down to the predetermined height-wise dimension and is thus axially braced, by for example self-tapping screws, from the rear, from the circuit carrier 12 in opposite relationship to the viewing direction 13, or in the viewing direction 13. Instead of the screws or in addition thereto, it is also possible to provide studs or pillars 43 (FIG. 2) which are formed thereon or which are riveted in place and which project from the collar 26 through the circuit carrier 12 or from the circuit carrier 12 through the collar 26 and which are subjected to hot-upsetting at their free ends, with axial stressing.

In FIG. 1, for easier assembly and dismantling, it is provided that the frame 27 has spring arms 33 which are formed thereon and which terminate in barb hooks 34. The spring arms 33 engage behind the circuit carrier 12, engaging through openings 32 in the circuit carrier 12. In that respect, it can be provided (this cannot be seen in FIG. 1) that the region behind which the barb hooks 34 engage on the circuit carrier 12 is slotted in a tongue-like configuration and in that way the sandwich structure is elastically pressed against the circuit carrier 12 by way of the barb hooks 34 of the frame 27, which engage against the free ends of the tongues.

The circuit carrier 12 can be in the form of a conventional circuit board lined with the conductor tracks 15. However, for a combined mechanical and electrical function of the circuit carrier 12, it is more appropriate to have recourse to the MID technology (Molded Interconnecting Devices), that is to say to have recourse to a circuit carrier 12 which is produced by injection molding with spatial profiling, with a receiving device 22 formed thereon and conductor tracks 15 formed therein.

Particularly when the circuit carrier 12 is not a separate circuit board but is produced for example using MID technology in the form of an injection molding, it is desirable for the cover 27 not to be provided as an independent assembly component, but to be molded directly on the circuit carrier 12, as in FIG. 2. A film hinge 41 connects a side edge 42 of the circuit carrier 12 to the corresponding side edge of the collar 26 extending peripherally on the frame 27. If the configuration does not have the trough-shaped receiving device (indicated at 22 in FIG. 1) which is in the form of a separate component or which is formed therein, with a lateral fitment mounting for the light-guide panel 19, the surface of the circuit carrier 12, which is at the viewing side, is desirably provided at least with a reflecting rib 29 which is preferably in the form of a spring element or which otherwise is provided with such a spring element, so that the light-guide panel 19 is caused to bear snugly in positively locking relationship with its deflection surface 37 for rearward illumination irradiation, against the reflector wall 38 (which is provided on the frame 27 in FIG. 2), as soon as the frame 27 is pivoted about the film hinge 41 on to the sandwich structure of the module 11 and for example latched again by way of barb hooks 34 in openings 32. For accurate positioning of the frame 27 which is movably connected to the circuit carrier 12, it is possible to provide studs or pillars 43 which are fixed to or molded on the circuit carrier 12 and which project through associated openings 44, in the opposite direction to the viewing direction 13, in the collar 26 of the frame. For additionally and definitively securing the structure of the display module 11, the ends of the studs 43, which project through the collar 26, can be subjected to hot peening again in the openings 44.

In regards to the connections shown in the invention, a form-locking connection is one that connects two elements together due to the shape of the elements themselves, as opposed to a force-locking connection, which locks the elements together by force external to the elements. A force-locking connection is one that connects two elements together by force external to the elements, as opposed to a form-locking connection, which is provided by the shapes of the elements themselves.

I claim:

1. A back-lit liquid crystal display, comprising:
   a circuit carrier;
   a liquid crystal cell electrically and mechanically connected to said circuit carrier;
   a light-guide panel disposed under said liquid crystal cell and through which light passes therethrough transversely with respect to a viewing direction, said light-guide panel having a limb and a first reflector surface;
   a frame accommodating said liquid crystal cell and said light-guide panel, said frame connected in a force-locking and/or a form-locking relationship to said circuit carrier;
   said frame, said circuit carrier, said liquid crystal cell, and said light-guide panel defining a display module for use behind an operating panel of a large domestic appliance;
   said circuit carrier having a first surface oriented towards said light-guide panel and thus opposite to a second surface for fitment with component elements, said first surface functioning as a second reflector surface; and
   light sources radiating the light through said circuit carrier into said limb of said light-guide panel and towards said first reflector surface for light deflection and thereby for lateral light entry into said light-guide panel.

2. The liquid crystal display according to claim 1, further comprising a peripherally extending, compressible spacer inserted between said liquid crystal cell and said light-guide panel.

3. The liquid crystal display according to claim 1, wherein:
   said circuit carrier has a flexuarlly elastic tongue region; and
   said frame has barb hooks, engaging through said circuit carrier, to said flexurally elastic tongue region of said circuit carrier.

4. The liquid crystal display according to claim 1, further comprising:
   studs for positioning said frame relative to said circuit carrier; and
   a collar extending around said frame, for positioning said frame relative to said circuit carrier.

5. The liquid crystal display according to claim 4, wherein said studs are formed from a hot-peenable plastic material and are formed on said collar or on said circuit carrier.

6. The liquid crystal display according to claim 1,
   wherein said circuit carrier is injected molded using molded interconnecting device technology;
   wherein said second reflector surface is disposed behind said light-guide panel; and
   further comprising a receiving device on which said second reflector surface is formed.

7. The liquid crystal display according to claim 1, wherein said circuit carrier and said frame are formed as a single injection molded piece with a film hinge connecting said circuit carrier to said frame in a pivotal hinge-like manner.

8. The liquid crystal display according to claim 1, further comprising studs for positioning said frame relative to said circuit carrier.

9. The liquid crystal display according to claim 1, further comprising a collar extending around said frame, for positioning said frame relative to said circuit carrier.

10. The liquid crystal display according to claim 1, wherein said first reflective surface is inclined.

* * * * *